US005819155A

United States Patent [19]

Worthy et al.

[11] Patent Number: 5,819,155

[45] Date of Patent: Oct. 6, 1998

[54] ACTIVE SYSTEM AND METHOD FOR REMOTELY IDENTIFYING RF BROADCAST STATIONS

[75] Inventors: David G. Worthy, 819 E. Vaughn, Gilbert, Ariz. 85234; Danny Lee Dubrall, Tempe, Ariz.

[73] Assignee: David G. Worthy, Gilbert, Ariz.

[21] Appl. No.: 749,776

[22] Filed: Nov. 20, 1996

[51] Int. Cl.[6] .................................................... H04B 17/00

[52] U.S. Cl. .................................................... 455/2; 348/1

[58] Field of Search ................................ 348/1, 2, 6, 10; 455/2, 6.2, 6.3, 41, 227; 340/505

[56] References Cited

U.S. PATENT DOCUMENTS

| | | | |
|---|---|---|---|
| 2,552,585 | 5/1951 | Rahmel . | |
| 2,896,070 | 7/1959 | Fremont et al. . | |
| 3,126,513 | 3/1964 | Kamen . | |
| 3,434,150 | 3/1969 | Wernlund . | |
| 3,456,192 | 7/1969 | Mixsell et al. . | |
| 3,800,223 | 3/1974 | Mead . | |
| 4,718,106 | 1/1988 | Weinblatt | 455/2 |
| 5,410,724 | 4/1995 | Worthy . | |
| 5,457,807 | 10/1995 | Weinblatt | 455/2 |
| 5,561,835 | 10/1996 | Worthy | 455/2 |
| 5,581,800 | 12/1996 | Fardeau et al. | 455/2 |
| 5,630,203 | 5/1997 | Weinblatt | 455/2 |

*Primary Examiner*—Andrew I. Faile
*Assistant Examiner*—Uyen Le
*Attorney, Agent, or Firm*—Meschkow & Gresham, P.L.C.; Lowell W. Gresham; Jordan M. Meschkow

[57] ABSTRACT

A survey electronics package (32) of a survey system (10) includes a transmitter (36) and a receiver (38). The transmitter (36) transmits a survey signal which a radio (12) residing in a detection zone (14) receives and demodulates to generate an audio echo signal. The audio echo signal is magnetically radiated from a speaker (26) of the radio (12). The receiver (38) magnetically senses this magnetically radiated audio echo signal. A bandpass filter (48) in the receiver (38) and a correlation process (86) insure that only a valid audio echo signal is recorded. When the detection of a valid audio echo signal corresponds to a radio (12) tuned to a particular radio station, a record is made of the detection.

26 Claims, 4 Drawing Sheets

10

32

ACTIVE SYSTEM AND METHOD FOR REMOTELY IDENTIFYING RF BROADCAST STATIONS

TECHNICAL FIELD OF THE INVENTION

The present invention relates generally to the identification of radio stations to which radio tuners are tuned. More specifically, the present invention relates to active radio station identification systems.

BACKGROUND OF THE INVENTION

The commercial broadcast industry and businesses which advertise through the RF broadcast media need to know the sizes of audiences which are tuned to particular stations at particular times. One prior art technique for obtaining such audience data is the use of audience participation surveys. Audience participation surveys require participants to identify the stations to which they may be tuned at specific times. Special equipment may be installed to automatically record the data, or the participants may be asked to keep log books. Either audience participation technique is undesirable because cooperation of the survey participants is obtained before the participants are surveyed, and this requirement of participant cooperation biases survey results. In addition, both techniques are excessively costly, particularly since the results obtained are often unreliable.

To address the shortcomings of audience participation surveys, electronic systems have been developed to obtain audience data without requiring audience participation. Conventionally, passive systems have been used. Passive survey systems have no transmitters, but have receivers which detect local oscillator signals electronically radiated from radio tuners.

A passive system works well for surveys of FM broadcast radio (i.e. 88 MHz–108 MHz) and other audiences. In particular, a passive system does not require audience participation, does not interfere with an audience's enjoyment of the content being broadcast by RF broadcast stations, and produces reliable results at a reasonable cost. However, the passive system has not achieved sufficiently reliable results in connection with AM broadcast radio (i.e. 550 KHz–1650 KHz). One reason for the less reliable results is that AM radios tend to exhibit a large variance in the signal level of radiated local oscillator signals, and the variance is correlated with automobile type. Consequently, a highly undesirable survey bias is introduced into survey results.

SUMMARY OF THE INVENTION

Accordingly, it is an advantage of the present invention that an improved active system and method for remotely identifying RF broadcast stations are provided.

Another advantage is that the present invention remotely obtains audience survey data without requiring audience cooperation.

Another advantage is that the present invention provides an active audience survey system which transmits a survey signal that is nearly, if not entirely, undetectable to survey participants.

Another advantage is that the present invention provides an active audience survey system which transmits a survey signal configured to cause a receiving radio to generate an audio echo signal that is electromagnetically radiated from a radio speaker.

Another advantage is that the present invention provides an active audience survey system which causes radio speakers to radiate a magnetic signal which can be correlated to a transmitted survey signal.

Another advantage is that the present invention provides an active audience survey system which may be adapted for use in taking audience surveys for a variety of RF broadcast media.

The above and other advantages of the present invention are carried out in one form by a remote audience survey method for identifying RF broadcast stations to which radios are tuned. The radios have respective speakers coupled thereto. The method calls for broadcasting a radio frequency signal configured to cause one of the radios to emit an audio echo signal from its respective speaker while simultaneously electromagnetically radiating the audio echo signal. The electromagnetically radiated audio echo signal is sensed.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
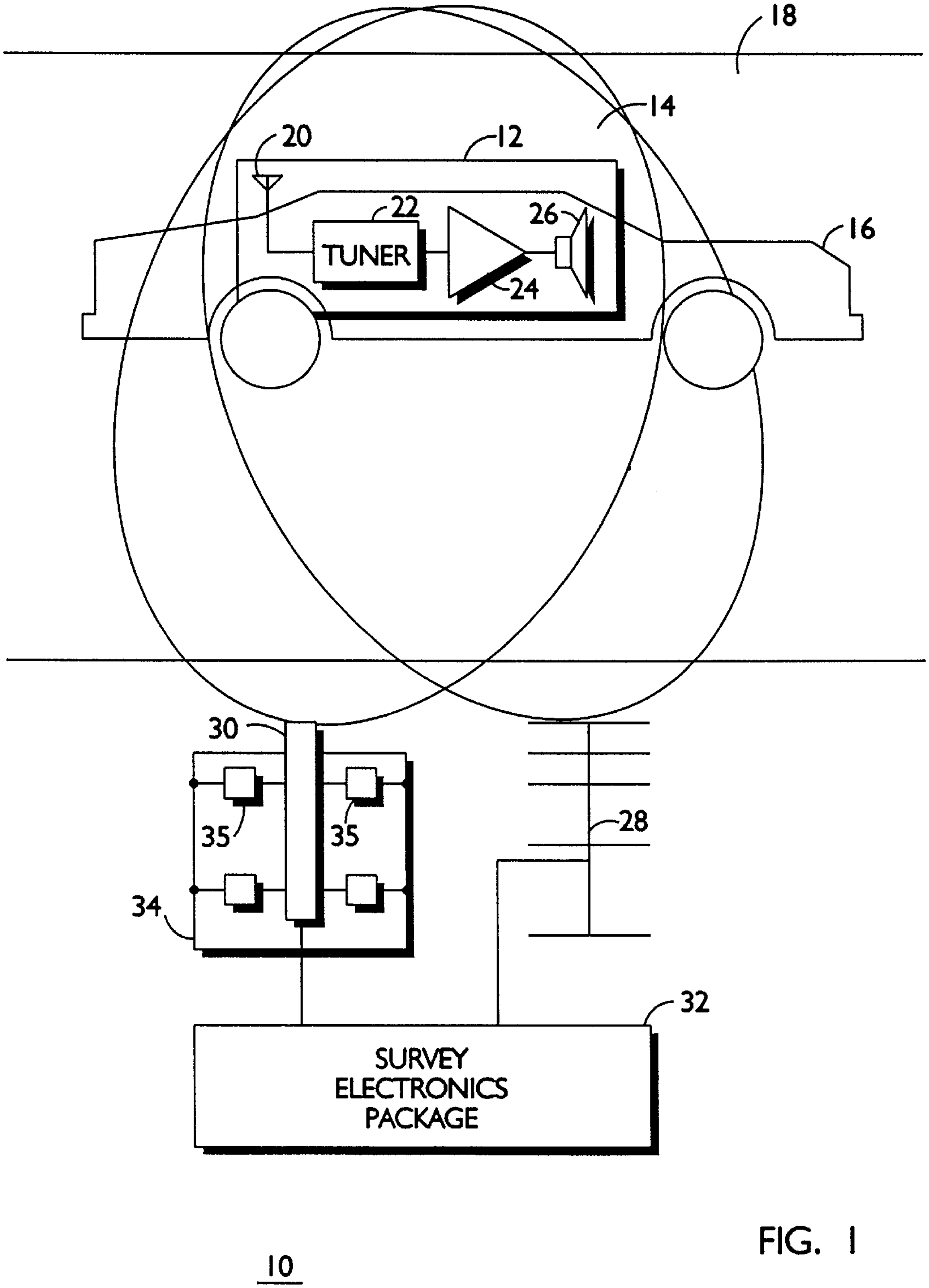
FIG. 1 shows a layout diagram of a environment within which a preferred embodiment of the present invention may operate.

FIG. 1 shows a layout diagram of a environment within which a preferred remote audience survey system 10 may operate. Generally, system 10 surveys radios 12, only one of which is shown in FIG. 1. Radios 12 pass through a detection zone 14, and system 10 identifies RF broadcast stations (not shown) to which radios 12 are tuned at the instants they pass through detection zone 14. Records of such detections are then processed in a conventional manner to generate audience survey results.

In the preferred embodiments, radios 12 are mounted in vehicles 16, only one of which is shown in FIG. 1. Vehicles 16 travel along a road 18. Detection zone 14 is established to extend across road 18. The RF broadcast stations transmit RF signals at predetermined frequencies within RF broadcast coverage areas. A plurality of RF broadcast stations share a common radio broadcast coverage area which often spans many square miles. Detection zone 14 resides within the broadcast coverage area but is desirably much smaller than the broadcast coverage area. At any given instant, several radios 12 can reside in detection zone 14. Over the course of a day, a multiplicity of radios 12 can pass through detection zone 14.

While the preferred embodiments of the present invention are specifically aimed at taking audience surveys for the audio radio broadcast industry, the present invention may also be adapted to take audience surveys for television and other RF communication industries. Hence, radios 12 encompass a wide variety of RF receiving devices each of which includes an antenna 20 coupled to a tuner 22, which in turn couples to an audio amplifier 24, which in turn couples to a conventional speaker 26.

Tuner 22 is controlled to specify a particular station to which radio 12 is tuned. After demodulation in tuner 22, an audio signal broadcast by the particular station is passed to audio amplifier 24, where it is sufficiently amplified to drive speaker 26. Speaker 26 emits an audio acoustic signal corresponding to the audio driving signal. The audio acoustic signal is typically produced in speaker 26 by a diaphragm (not shown) that vibrates when a conductive coil (not shown) attached to the diaphragm and placed near a magnet (not shown) is energized by the audio driving signal. The energization of the speaker's conductive coil also causes the coil portion of speaker 26 to electromagnetically radiate the audio signal.

Antennas 28 and 30 have antenna patterns that overlap to define detection zone 14. Antennas 28 and 30 can be located above, beside, or on a median within road 18. Antennas 28 and 30 each couple to a survey electronics package 32. Antenna 28 is used in a signal-transmitting role so that signals broadcast from antenna 28 are targeted to detection zone 14. Antenna 30 is used in a signal receiving role to detect signals electromagnetically radiated from within detection zone 14.

Antenna 28 transmits one or more RF survey signals which are related to the RF carrier signals of the radio stations about which an audience survey is being taken. The precise relationship can take many different forms. For example, the survey signal can exhibit a frequency within the tuning range of radio 12, much like the broadcast stations transmit signals having carrier frequencies within the tuning range of radio 12. Alternatively, the survey signal can exhibit a frequency which is a sub-harmonic of the radio's tuning range so that a harmonic of this sub-harmonic is within the radio's tuning range. Moreover, the survey signal or its harmonic may precisely equal a radio station's carrier center frequency, or it may be offset in frequency from the radio station's carrier center frequency by a small amount. In the preferred embodiments, the survey signal is transmitted at a very low power level, which is partly responsible for defining the small size of detection zone 14.

Radio 12 receives and processes the survey signal like it processes RF broadcast station signals. Accordingly, when radio 12 is tuned to an RF broadcast station frequency that is related to the survey signal frequency, the survey signal causes speaker 26 to emit an audio acoustic signal which echoes the survey signal. Simultaneously, the audio echo signal is electromagnetically radiating from speaker 26. No such echo signal is acoustically emitted or electromagnetically radiated when radio 12 is not tuned to the survey signal's related RF broadcast station frequency.

The electromagnetic signals radiated by speaker 26, and particularly the above-discussed audio echo signal generated in response to the survey signal, have both electrostatic and magnetic field components. In the preferred embodiment of the present invention, antenna 30 is configured to sense magnetic fields. The preferred embodiment of system 10 uses magnetic field sensing rather than electrostatic field sensing because magnetic field sensing antennas at audio frequencies are smaller than corresponding electrostatic field sensing antennas, and magnetic noise at the frequency of the audio echo signal is less pervasive. Accordingly, antenna 30 has an inductive, ferrite construction which is suitable for sensing magnetic signals in the audio frequency spectrum. A model BF-6 magnetic field induction sensor manufactured by Electromagnetic Instruments, Inc. of Richmond, Calif. is one example of a suitable antenna 30.

Those skilled in the art will appreciate that the magnetically radiated audio echo signal represents a very weak disturbance in the magnetic field within detection zone 14. Other factors collaborate in establishing this magnetic field. One such factor is the magnetic field of the earth. For this reason, antenna 30 is desirably kept substantially stationary while the audio echo signal is being sensed at antenna 30. Otherwise, signals received at antenna 30 due to changing orientation relative to the earth's magnetic field could override and interfere with the audio echo signal.

Likewise, antenna 30 is desirably mounted in a shock-stabilized housing 34 that holds antenna 30 within dashpots or shock absorbers 35. Shock stabilized housing 34 physically decouples antenna 30 from air and ground vibrations in the vicinity of antenna 30. Such vibrations could also cause a changing orientation relative to the earth's magnetic field which produces an overriding or interfering signal. These vibrations are a common occurrence near road 18, where large trucks may occasionally pass near antenna 30.

In alternate embodiments, one or more of antennas 28 and 30 can be configured as multiple antenna arrays which use phase cancellation techniques to reduce extraneous noise and improve directionality within detection zone 14.

Figure 2:
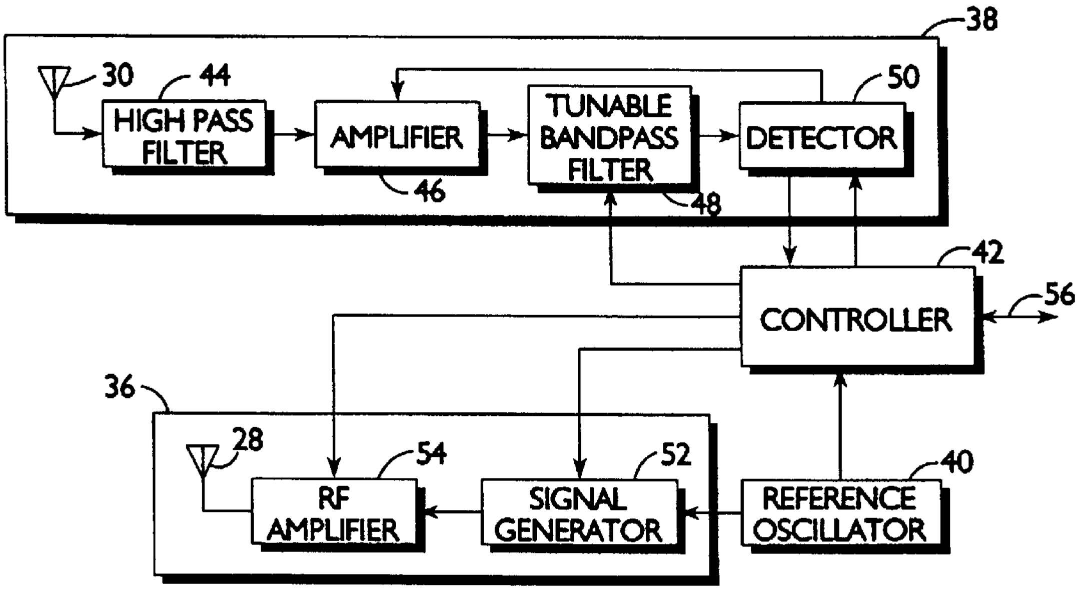
FIG. 2 shows a block diagram of a survey electronics package used by a preferred embodiment of the present invention.

FIG. 2 shows a block diagram of survey electronics package 32 (see FIG. 1) used by system 10. For convenience, FIG. 2 depicts antenna 28 (see FIG. 1) as being a part of a transmitter 36 and antenna 30 (see FIG. 1) as being a part of a receiver 38. Transmitter 36, receiver 38 and a reference oscillator 40 each couple to a controller 42.

Within receiver 38, antenna 30 couples to a signal input of a high pass filter 44. Filter 44 has an output which couples to a signal input of an amplifier 46. An output of amplifier 46 couples to a signal input of a tunable bandpass filter 48, and an output of filter 48 couples to a signal input of a detector 50. An automatic gain control (AGC) control output of detector 50 couples to a gain control input of amplifier 46. A signal output of detector 50 couples to an input of controller 42. Control outputs of controller 42 couple to control inputs of filter 48 and of detector 50. In an alternative embodiment, the positions depicted in FIG. 2 for amplifier 46 and filter 48 may be swapped.

As a minimum, filter 44 blocks 50–60 Hz frequencies, but filter 44 can have a cutoff frequency considerably higher than 60 Hz. In addition, filter 44 provides impedance matching and a tunable Q for antenna 30. Amplifier 46 and detector 50 form an AGC control loop.

Tunable bandpass filter 48 has an audio-range center frequency specified by controller 42. Preferably, filter 48 is configured to have a −3 dB pass bandwidth which is less than 10% of this center frequency, and more preferably around 1% or less of this center frequency. Accordingly, only a small audio frequency range passes through filter 48. As discussed in more detail below, controller 42 tunes filter 48 to allow passage of an expected audio echo signal frequency but to reject most other frequencies.

Reference oscillator 40 provides a stable frequency reference, and is preferably a temperature compensated oscillator. In the embodiment depicted in FIG. 2, oscillator 40, or a signal derived from oscillator 40, serves as a clock signal for controller 42. Controller 42 can use this clock signal to generate the signal that controls the tuning of filter 48.

Detector 50 amplifies and rectifies its input signal and compares the result to a threshold value supplied by controller 42. A sensed audio echo signal causes this threshold to be exceeded. Most other magnetic signals in the audio frequency range do not cause the threshold to be exceeded due to the operation of filters 44 and 48.

Reference oscillator 40 additionally couples to a reference input of a signal generator 52 within transmitter 36. In the preferred embodiment, signal generator 52 is a direct digital synthesizer capable of directly, quickly, and accurately synthesizing frequencies in the AM broadcast radio band (i.e. 550–1650 Khz), and the synthesized frequency is controlled by controller 42.

An output of signal generator 52 couples to an input of an RF amplifier 54, and a control output from controller 42 optionally couples to a modulation input of amplifier 54. Amplifier 54 optionally applies modulation from controller 42 and provides impedance matching with antenna 28. In an alternate embodiment, a mixer (not shown) may be inserted between signal generator 52 and amplifier 54 to mix the signal generator output signal with, for example, a 90 MHz oscillation signal to adapt system 10 (see FIG. 1) to performing audience surveys in the FM radio band.

Controller 42 may be implemented using conventional microprocessor and microcontroller circuits and related peripherals well known to those skilled in the art. Such circuits and peripherals include non-volatile and volatile memory (not shown) within which a computer program is stored and within which variables, tables, lists, and databases manipulated by the computer program are stored. A communications port 56 of controller 42 provides a way to enter and extract data from controller 42. Port 56 may be provided by a disk drive, modem, cellular or land-line telecommunications link, and the like.

Figure 3:
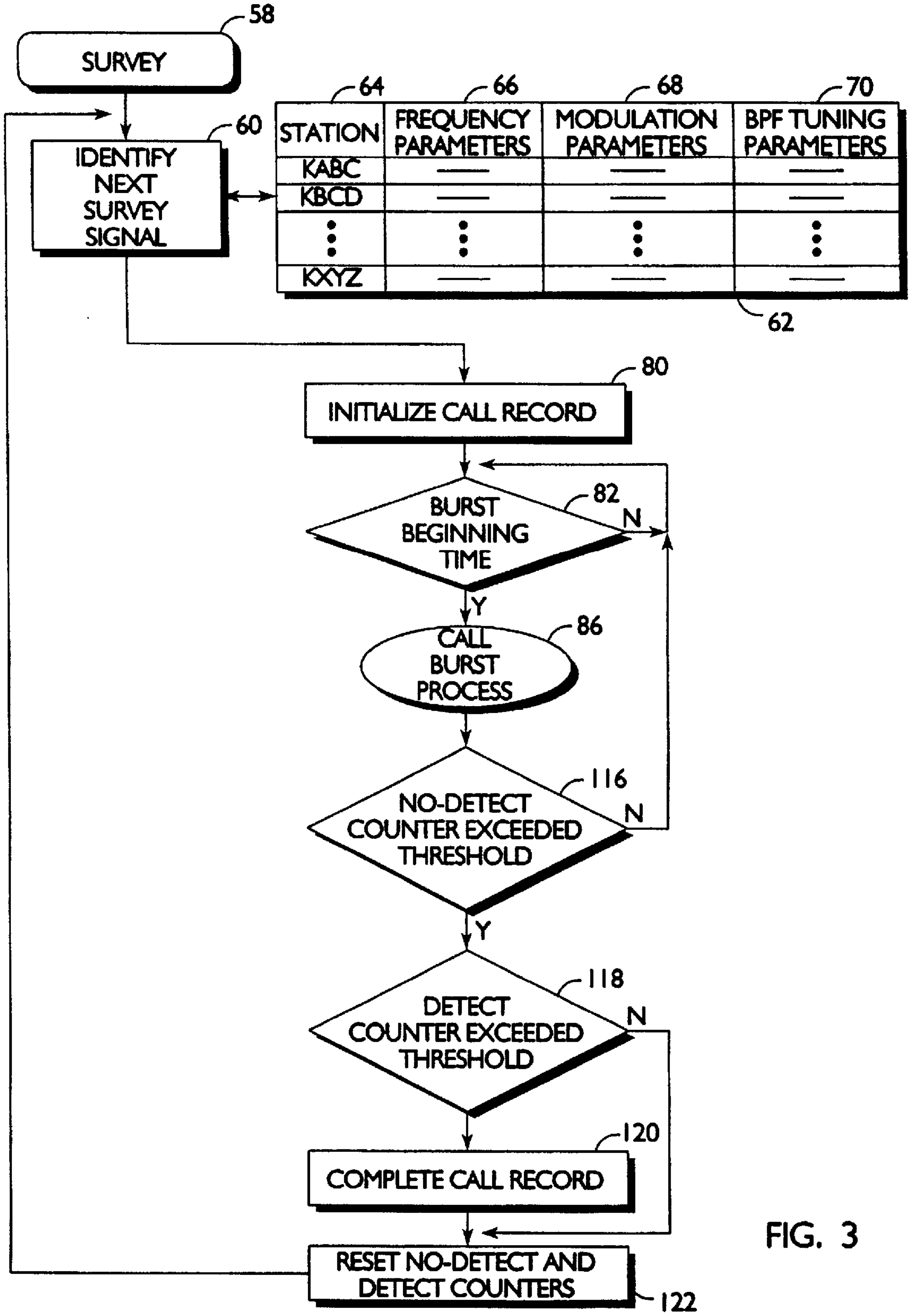
FIG. 3 shows a flow chart of a survey process performed by a preferred embodiment of the present invention.

FIG. 3 shows a flow chart of a survey process 58 performed by system 10. Process 58 is defined by a computer program stored in and executed by controller 42 (see FIG. 2). Generally, process 58 operates continuously in a loop to obtain data which are then communicated through port 56 (see FIG. 2) and further processed in a conventional manner to form an audience survey.

Process 58 includes a task 60, which identifies a next survey signal. Task 60 may consult a table 62 in identifying a next survey signal. Table 62 depicts an exemplary memory structure which associates radio stations 64 with related frequency parameters 66, modulation parameters 68, and bandpass filter (BPF) tuning parameters 70. In the preferred embodiment, task 60 identifies a radio station, depicted by a row in table 62, whose identity differs from the identity of a radio station that was selected in an immediately previous iteration of process 58.

As discussed above, the relationship between the frequency of the survey signal and the particular carrier frequencies of the radio stations included in a survey may vary from application to application. Frequency parameters 66 represent data that serve as instructions for the control of signal generator 52 by controller 42 (see FIG. 2) to specify a survey signal frequency that is related to a particular radio station. In the preferred embodiment, these instructions cause signal generator 52 to generate a signal in the 550–1650 KHz frequency range but offset from a surveyed radio station's carrier frequency by a frequency preferably in the range of 1–10 KHz and more preferably around 6 KHz.

For AM broadcast radio stations, this frequency offset causes radio 12 (see FIG. 1) to produce the audio echo signal at a frequency equivalent to the frequency offset. This offset frequency relationship between the survey signal and a radio station's carrier frequency is desirable because it permits the use of a particularly low power survey signal. In other words, the survey signal need not overpower a radio station's broadcast signal within detection zone 14 (see FIG. 1) but can simply inject an additional signal. For FM broadcast radio stations, a frequency offset survey signal relationship does not produce the same effect. Consequently, for a survey of FM broadcast radio stations, frequency parameters 66 desirably indicate the surveyed radio stations' carrier center frequencies.

The offset frequency defines the frequency of the audio echo signal which receiver 38 detects. Audio echo signals having frequencies greater than 1 KHz are desirable because typical speech includes fewer frequency components above 1 KHz than below and because the magnetic spectrum below 1 KHz is usually considerably nosier than above 1 KHz. Magnetic noise can be caused by conductors such as vehicles 16 (see FIG. 1) moving through the earth's magnetic field, by the pervasive 50–60 cycle electrical power distribution system, and by automotive features such as spark plug firings. Thus, the potential for falsely defining an interfering signal as a valid audio echo signal is reduced by causing the audio echo signal to exhibit a frequency greater than 1 KHz.

On the other hand, audio echo signals having frequencies less than 10 KHz are desirable because the population of radio audio amplifiers 24 (see FIG. 1) exhibits great variance in its ability to pass signals having frequencies greater than 10 KHz. Moreover, the variance can be non-random, causing highly undesirably biases in survey results. A 6 KHz audio echo signal represents a beneficial compromise between these two extremes. Few interfering signals are found at 6 KHz, and virtually all radio amplifiers 24 can reproduce a 6 KHz audio echo signal.

A composite wide bandwidth survey signal may be generated in an alternate embodiment. The composite survey signal simultaneously has frequency components related to many or all radio stations being surveyed. In this alternate embodiment, optional modulation parameters 68 define how controller 42 (see FIG. 2) applies different modulation signatures to the different components so that different components of a composite audio echo signal can be distinguished from one another. For example, modulation parameters 68 may specify a unique modulating tone to apply to each survey signal frequency component, and the modulating tones may be in the 1–10 KHz range. However, any of a wide variety of modulating techniques, including AM, FM, FSK, phase, Pulse (CW), burst, sweep, etc. may be defined. Correspondingly, bandpass filter tuning parameters 70 define how controller 42 controls bandpass filter 48 (see FIG. 2) to detect the unique frequency components.

Figure 4:
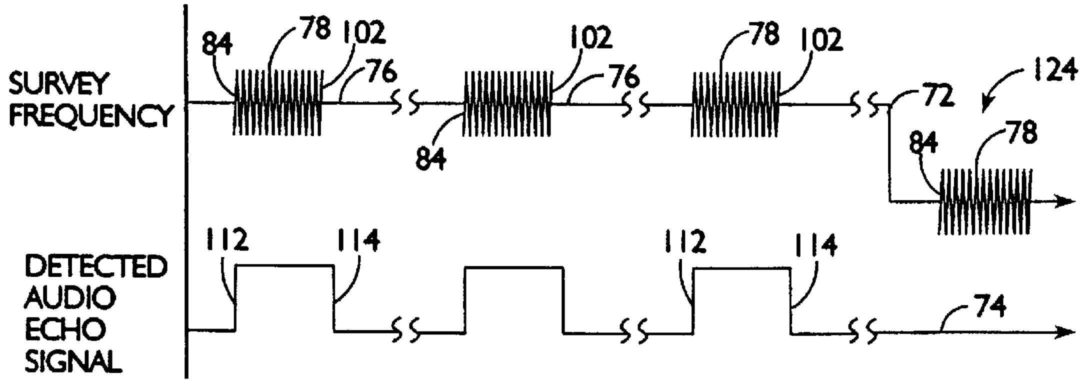
FIG. 4 shows a timing diagram of a radio frequency survey signal and a detected audio echo signal generated in a preferred embodiment of the present invention.

FIG. 4 shows a timing diagram featuring a preferred radio frequency survey signal 72 and a correlated detected audio echo signal 74. Referring to FIGS. 3 and 4, task 60 in process 58 occurs during a silent period 76 of survey signal 72. During silent period 76, survey signal 72 is not active, and transmitter 36 (see FIG. 2) is not transmitting. As illustrated in FIG. 4, a burst period 78 of survey signal 72 follows silent period 76. Burst period 78 is sufficiently short so that survey signal 72 is nearly, if not entirely, undetectable to survey participants. Desirably, burst period 78 is less 10 msec long, but burst period 78 is of sufficient length to permit the audio echo signal to pass through filter 48 and be detected by detector 50 (see FIG. 2). In the preferred embodiment, burst period 78 is significantly shorter than silent period 76. Silent period 76 allows survey signal 72 to minimally interfere with radio station broadcast signals because survey signal 72 is inactive the majority of the time.

Desirably, silent period 76 is sufficiently long so that the survey signal is nearly, if not entirely, undetectable to survey participants. For example, silent period 76 may continue for up to 30 msec or longer.

After task 60 in process 58, a task 80 initializes a sampling or "call" data record. A call record includes data relevant to the detection of a radio station to which a radio 12 may be tuned. Task 80 may, for example, record a date and start time for survey signal 72 and data corresponding to the identity of the radio station identified above in task 60. This call data record will be completed later and saved in memory if a radio 12 tuned to the station selected above in task 60 is detected. If such a radio 12 is not detected, the call data record will not be completed.

Following task 80, a query task 82 determines whether a beginning time 84 for burst period 78 has occurred yet. Beginning time 84 may be determined by examining a timer (not shown) which times silent period 76. If beginning time 84 has not yet occurred, program control remains at task 82. When beginning time 84 is detected in task 82, process 58 calls a burst process 86.

Figure 5:
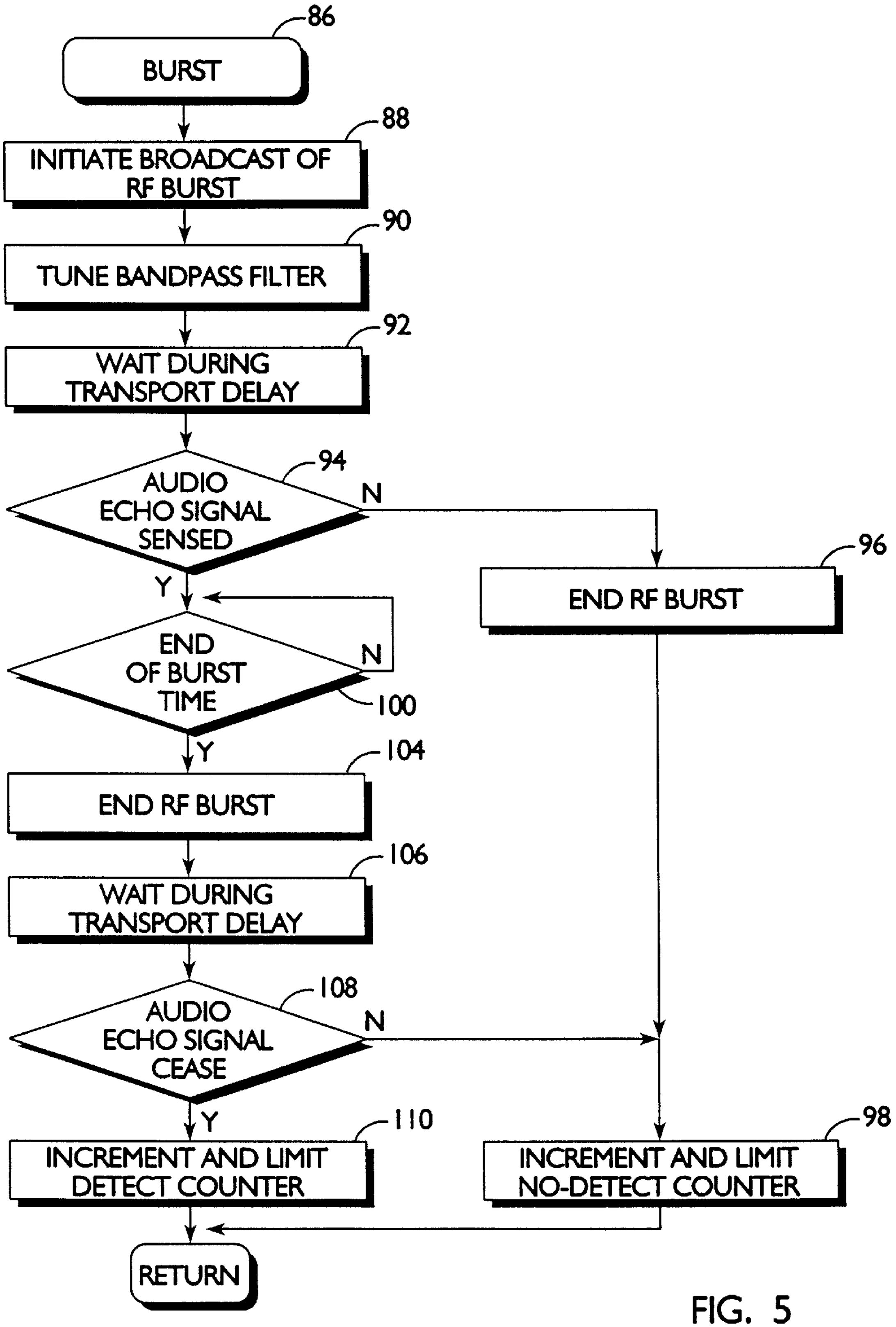
FIG. 5 shows a flow chart of a burst process performed by a preferred embodiment of the present invention.

FIG. 5 shows a flow chart of burst process 86. Referring to FIGS. 4 and 5, burst process 86 is performed throughout the duration of burst period 78 to determine whether an audio echo signal is detected in response to the transmission of survey signal 72.

Process 86 includes a task 88 which initiates the broadcast of RF survey signal 72. Task 88 may consult frequency parameters 66 and modulation parameters 68 of table 62 (see FIG. 3) to determine the appropriate frequency for survey signal 72 and any needed modulation characteristics. Transmission of survey signal 72 continues upon the completion of task 88.

Following task 88, a task 90 tunes bandpass filter 48 as required by tuning parameters 70 in table 62 (see FIG. 3) so that detector 50 can detect the audio echo signal. Task 90 is an optional task that may be omitted when the audio echo signals corresponding to all radio stations being surveyed exhibit the same frequency. In that case, task 90 may be performed less often than upon the initiation of each burst period 78.

After task 90, a task 92 imposes a brief transport waiting period. This waiting period compensates for transport delay between commanding the initiation of burst period 78 and detecting a responsive audio echo signal at receiver 38 (see FIG. 2). Accordingly, after task 92, if a radio 12 tuned to a radio station having a carrier frequency related to the frequency of the survey signal 72 initiated in task 88 is in detection zone 14, the detection of an audio echo signal should be indicated by receiver 38. After task 92, a query task 94 investigates whether the audio echo signal has been sensed. A valid detected audio echo signal 74 should begin soon after the initiation of survey signal 72.

When no audio echo signal is sensed, a task 96 is performed to inactivate the RF survey signal, thereby ending burst period 78 and beginning silent period 76. Thus, when no audio echo signal is sensed, burst period 78 can be even more brief than when an audio echo signal is detected. Next, a task 98 increments a "no-detect" counter up to but not past a limiting maximum count. The no-detect counter tracks the number of survey signals transmitted for which no corresponding audio echo signal was detected. After task 98, program flow exits process 86.

When task 94 determines that an audio echo signal has been sensed, a query task 100 determines whether a burst ending time 102 has occurred yet. So long as the burst ending time 102 has not yet occurred, program control remains at task 100. However, in an alternate embodiment tasks 94 and 100 can be combined to verify that the audio echo signal continues for as long as survey signal 72 remains active.

When task 100 discovers burst ending time 102, a task 104 ends burst period 78 and begins silent period 76. After task 104, a task 106 imposes a transport waiting period similar to that discussed above in connection with task 92. However, during task 106, indications of detecting an audio echo signal should disappear.

Next, a query task 108 determines whether the audio echo signal ceased. A valid detected audio echo signal 74 should cease when survey signal 72 ceases. However, a false audio echo signal probably will not cease at precisely the same instant. When task 108 determines that an audio echo signal detection did not cease, program control proceeds to task 98 to increment the no-detect counter, then exits process 86.

When task 108 determines that audio echo signal 74 ceased in response to the cessation of survey signal 72, a task 110 is performed. Task 110 increments a "detect" counter up to but not past a limiting maximum count. The detect counter tracks the number of survey signals transmitted for which a correlated audio echo signal was detected. After task 110, program flow exits process 86.

Accordingly, process 86 activates survey signal 72 to initiate burst period 78 and deactivates survey signal 72 to define burst ending time 102. In conjunction with this management of survey signal 72, process 86 correlates the receipt of any sensed audio echo signal with survey signal 72. In particular, the tuning of bandpass filter 48 (see FIG. 2) in task 90 or elsewhere causes most signals detected by detector 50 (see FIG. 2) to be valid audio echo signals. However, tasks 94 and 108 cause process 86 to determine whether a beginning time 112 of detected audio echo signal 74 and an ending time 114 of detected audio echo signal 74 tracks the beginning time 84 and ending time 102 of survey signal 72, respectively. Consequently, only when the detection of a valid audio echo signal is highly likely is the detect counter incremented in task 110.

While FIG. 5 depicts a few tasks which correlate detected audio echo signal 74 to survey signal 72, those skilled in the art may devise additional correlation testing tasks. For example, a task (not shown) may be included to verify that detected audio echo signal 74 is inactive immediately prior to initiating survey signal 72 in task 88.

Upon exiting process 86, program flow returns to survey process 58 (see FIG. 3). Referring back to FIG. 3, program flow returns to a query task 116 in process 58. Query task 116 determines whether the no-detect counter, discussed above in connection with task 98 (see FIG. 5), has reached a predetermined threshold value. Desirably, this threshold is set to permit a plurality of bursts 78 before the threshold is exceeded. So long as the threshold has not yet been exceeded, program control loops back to task 82.

Program control will remain in a loop including task 82, process 86, and task 116 until the no-detect threshold is encountered. In the preferred embodiment, as long as program control remains in this loop, burst period 78 of survey signal 72 repeats after silent period 76. During the repeated burst periods 78, survey signal 72 continues to exhibit the same frequency. Accordingly, this programming loop causes system 10 to scan through radio station frequencies and to lock on a particular radio station frequency until an audio echo signal corresponding to that radio station is no longer sensed. The event of an audio echo signal being no longer sensed is indicated when the no-detect counter reaches its threshold value.

The scanning of radio station frequencies one at time and locking onto a scanned frequency until a corresponding audio echo signal is no longer sensed is desirable because it eliminates a bias in survey results. Namely, a survey results bias would occur if receiver 30 were unable to detect precisely how many radios 12 were tuned to a single radio station. This bias would favor less popular radio stations over more popular radio stations which would be under-counted when multiple listeners concurrently in detection zone 14 were counted as a single listener. This technique causes some radios 12 to pass through detection zone 14 undetected by system 10. However, no bias results because the undetected radios 12 exhibit no significant correlation with radio station listening preferences.

When task 116 eventually determines that the no-detect counter has reached its threshold, a query task 118 is performed. Task 118 determines whether the detect counter discussed above in connection with task 110 (see FIG. 5) has reached a threshold. Task 118 performs another correlation test between survey signal 72 and detected audio echo signal 74. Accordingly, task 118 forces a plurality of audio echo signal detections to result from a corresponding plurality of survey signal bursts. If the detect counter threshold has been reached, a task 120 completes the call record initialized above in task 80. Task 120 may add data describing a stop time, signal strength, and other factors to the call record. In addition, task 120 records the call record in memory so that it may later be communicated to a processing center (not shown) for compilation into a survey results report. In other words, task 120 records the detection of one of radios 12 tuned to one of the surveyed RF broadcasting stations.

After task 120 and when task 118 determines that the detect counter threshold has not been reached, a task 122 is performed. Task 122 resets the no-detect and detect counters, discussed above in connection with tasks 98 and 110 (see FIG. 5) and with tasks 116 and 118. After task 122, program control loops back to task 60 to repeat process 58 at a different survey signal frequency, as indicated at time 124 in FIG. 4. In addition, FIG. 4 depicts an exemplary situation at time 124 where no detected audio echo signal activation results in response to a burst 78 of survey signal 72. This exemplary situation occurs when no radio 12 tuned to a radio station broadcast frequency related to the frequency of survey signal 72 resides in detection zone 14. Consequently, no audio echo signal is generated.

In summary, the present invention provides an improved active system and method for remotely identifying RF broadcast stations. The preferred embodiments of the present invention remotely obtain audience survey data without requiring audience cooperation. The active audience survey system transmits a survey signal that is nearly, if not entirely, undetectable to survey participants. The active audience survey system also transmits a survey signal configured to cause a receiving radio to generate an audio echo signal that is electromagnetically radiated from a radio speaker. The magnetic component of this radiation is sensed and correlated to the transmitted survey signal. An assortment of survey signal configurations permits adaptation of the system for use in taking audience surveys for a variety of RF broadcast media.

Although preferred embodiments of the invention have been illustrated and described in detail, it will be readily apparent to those skilled in the art that various modifications may be made therein without departing from the spirit of the invention or from the scope of the appended claims.

What is claimed is:

1. A remote audience survey method for identifying RF broadcast stations to which radios are tuned, said radios having respective speakers coupled thereto, and said method comprising the steps of:

broadcasting a radio frequency signal configured to cause one of said radios to emit an audio echo signal from its respective speaker, said speaker simultaneously electromagnetically radiating said audio echo signal; and sensing said electromagnetically radiated audio echo signal.

2. A method as claimed in claim 1 wherein said sensing step comprises the step of monitoring a magnetic field.

3. A method as claimed in claim 2 wherein:

said radios move during said broadcasting and sensing steps;

said monitoring step uses a magnetic field sensor; and said method additionally comprises the step of keeping said magnetic field sensor substantially stationary during said sensing step.

4. A method as claimed in claim 2 wherein:

said monitoring step uses a magnetic field sensor; and said method additionally comprises the step of mounting said magnetic field sensor in a shock-stabilized housing.

5. A method as claimed in claim 1 wherein:

said RF broadcast stations have broadcast coverage areas;

said method additionally comprises the step of establishing a detection zone which is smaller than said broadcast coverage areas;

said broadcasting step targets said radio frequency signal in said detection zone; and said sensing step is configured to sense said electromagnetically radiated audio echo signal radiating from within said detection zone.

6. A method as claimed in claim 1 additionally comprising the step of determining whether said sensed electromagnetically radiated audio echo signal correlates to said radio frequency signal.

7. A method as claims in claim 6 wherein said correlation determining step comprises the step of determining whether a beginning time and an ending time of said sensed electromagnetically radiated audio echo signal tracks a beginning time and an ending time of said radio frequency signal.

8. A method as claimed in claim 1 additionally comprising the step of configuring said radio frequency signal so that said audio echo signal has at least one tone in a frequency range of 1–10 KHz.

9. A method as claimed in claim 1 additionally comprising the step of configuring said radio frequency signal to exhibit a frequency less than 1650 KHz.

10. A method as claimed in claim 1 wherein:

said RF broadcast stations transmit station signals at station carrier frequencies; and said radio frequency signal exhibits one or more frequencies related to said station carrier frequencies.

11. A method as claimed in claim 10 wherein, at a single instant, said radio frequency signal exhibits a frequency which is offset in frequency from one of said station frequencies, said offset in frequency defining said audio echo signal.

12. A method as claimed in claim 1 wherein:

said RF broadcast stations transmit station signals at station carrier frequencies; and said radio frequency signal exhibits, at a single instant, a survey frequency which is related to one of said station carrier frequencies.

13. A method as claimed in claim 12 wherein said broadcasting step comprises the step of configuring said radio frequency signal as a burst which continues at said survey frequency for a first duration and which repeats at said survey frequency after a silent period which lasts for a second duration, said first duration being shorter than said second duration.

14. A method as claimed in claim 13 wherein said survey frequency is a first survey frequency which is related to a first one of said station carrier frequencies, and said method additionally comprises the steps of:

continuing said radio frequency signal at said first survey frequency until said sensing step no longer senses said electromagnetically radiated audio echo signal; and repeating said broadcasting step at a second survey frequency when said sensing step no longer senses said electromagnetically radiated audio echo signal, said second survey frequency being related to a second one of said station carrier frequencies.

15. A method as claimed in claim 13 wherein:

said broadcasting step additionally comprises the step of continuing said radio frequency signal for a plurality of bursts; and said method additionally comprises the step of recording detection of one of said radios tuned to said one of said RF broadcast stations after said sensing step senses said electromagnetically radiated audio echo signal a predetermined number of times.

16. A method as claimed in claim 1 wherein:

said broadcasting step comprises the step of applying modulation to said radio frequency signal; and said sensing step comprises the step of filtering a received signal in a manner which is responsive to said modulation applied to said radio frequency signal.

17. A method as claimed in claim 1 wherein:

said method additionally comprises the step of configuring said radio frequency signal so that said audio echo signal has at least one tone exhibiting a predetermined frequency; and said sensing step comprises the step of filtering a received signal using a bandpass filter having a pass bandwidth less than 10% of said predetermined frequency.

18. A remote audience survey system for identifying RF broadcast stations to which radios are tuned, said radios having respective speakers coupled thereto, and said system comprising:

a transmitter having a first antenna configured to transmit a radio frequency survey signal, said survey signal being configured to cause one of said radios to magnetically radiate an audio echo signal;

a receiver having a second antenna configured to sense said magnetically radiated audio echo signal; and a controller, coupled to said transmitter and said receiver, said controller being configured to correlate said magnetically radiated audio echo signal to said survey signal.

19. A system as claimed in claim 18 wherein:

said transmitter comprises a signal generator configured so that said survey signal exhibits a frequency less than 1650 KHz; and at least one of said controller and said signal generator is configured so that said magnetically radiated audio echo signal has at least one tone in a frequency range of 1–10 KHz.

20. A system as claimed in claim 18 wherein:

said RF broadcast stations transmit station signals at station carrier frequencies; and said transmitter comprises a signal generator configured so that, at a single instant, said survey signal exhibits a frequency which is offset in frequency from one of said station carrier frequencies, said offset in frequency defining said magnetically radiated audio echo signal.

21. A system as claimed in claim 18 wherein:

said RF broadcast stations transmit station signals at station carrier frequencies; and said transmitter comprises a signal generator configured so that, at a single instant, said survey signal exhibits a survey frequency which is related to one of said station carrier frequencies.

22. A system as claimed in claim 21 wherein said controller is configured to format said survey signal as a burst which continues at said survey frequency for a first duration and which repeats at said survey frequency after a silent period which lasts for a second duration, said first duration being shorter than said second duration.

23. A system as claimed in claim 22 wherein:

said survey frequency is a first survey frequency which is related to a first one of said station carrier frequencies; and said controller is configured to continue said survey signal at said first survey frequency until said audio echo signal is not sensed at said receiver, then to repeat said survey signal at a second survey frequency, said second survey frequency being related to a second one of said station carrier frequencies.

24. A remote audience survey system for identifying a radio station to which a radio located in a detection zone is tuned, said radio having a speaker coupled thereto, and said system comprising:

a controller;

a signal generator coupled to said controller and configured to generate a survey signal in response to control signals provided by said controller;

a first antenna coupled to said signal generator, said first antenna broadcasting said survey signal in said detection zone to cause said radio to emit an audio echo signal from its speaker while simultaneously magnetically radiating said audio echo signal;

a second antenna, said second antenna being configured to sense said magnetically radiated audio echo signal;

a bandpass filter having an input coupled to said second antenna and having an output; and a detector having an input coupled to said bandpass filter and having an output coupled to said controller, wherein said controller is configured to correlate said magnetically radiated audio echo signal to said survey signal.

25. A system as claimed in claim 24 wherein:

said signal generator is configured so that said survey signal exhibits a frequency less than 1650 KHz; and said bandpass filter is configured so that said detector detects at least one audio tone in a frequency range of 1–10 KHz.

26. A system as claimed in claim 25 wherein:

said one audio tone exhibits a predetermined frequency; and said bandpass filter has a pass bandwidth less than 10% of said predetermined frequency.

* * * * *